Aug. 19, 1924.

R. W. HATTON

PLATE CLAMP

Filed Nov. 3, 1923

1,505,919

2 Sheets-Sheet 1

INVENTOR
ROBERT WILLIAM HATTON,
By his Attorneys

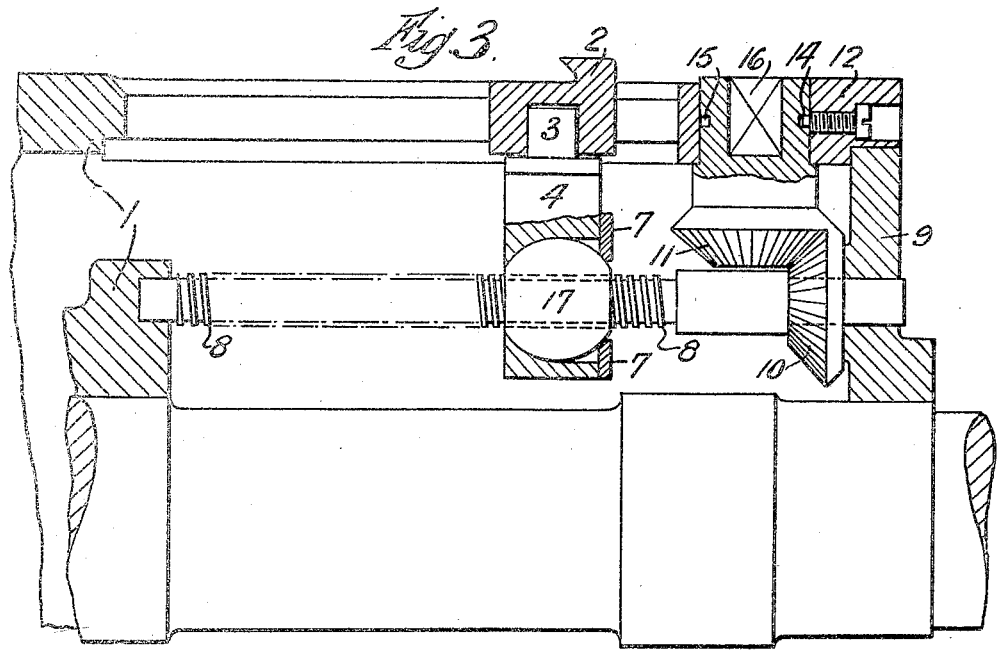
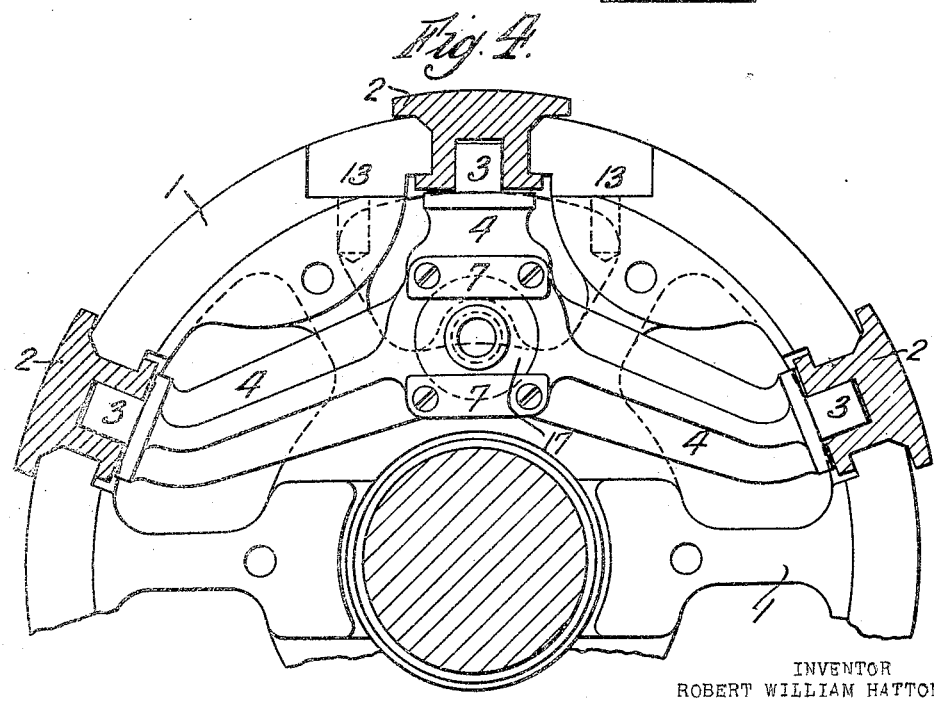

Patented Aug. 19, 1924.

1,505,919

UNITED STATES PATENT OFFICE.

ROBERT WILLIAM HATTON, OF BROMLEY, ENGLAND, ASSIGNOR TO R. HOE AND CO., OF NEW YORK, N. Y., A CORPORATION OF NEW YORK.

PLATE CLAMP.

Application filed November 3, 1923. Serial No. 672,499.

*To all whom it may concern:*

Be it known that I, ROBERT WILLIAM HATTON, a subject of the King of Great Britain, residing at 2 Wendover Road, Bromley, Kent, England, have invented new and useful Improvements in Plate Clamps, of which the following is a specification.

This invention relates to improved means for securing a stereotype plate to a type cylinder.

According to this invention I secure a stereotype plate to a type cylinder by means of a plurality of clips which are directly engaged by studs integral with a spider which latter is so mounted as to be capable of rocking, and I provide means for moving the spider towards a fixed ring or dog on the cylinder, for example, a screwed rod, which engages a nut having trunnions engaging the spider, or engages a spherical nut mounted on the spider. With such an arrangement, if the edges of the stereotype plate are uneven the spider is enabled to tilt and an even pressure is exerted by the clips.

Figure 1:
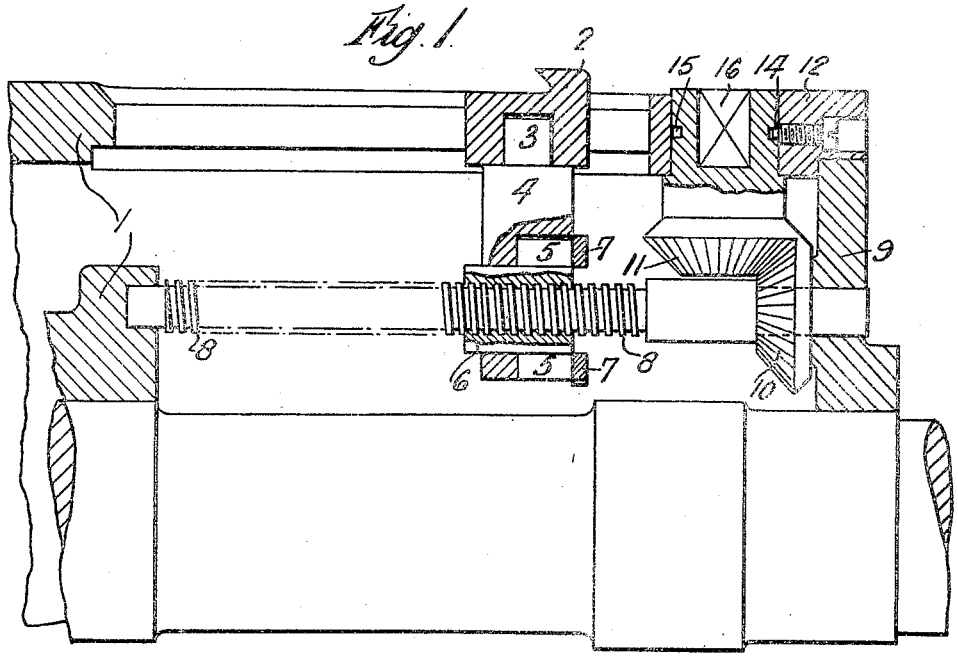
Figure 2:
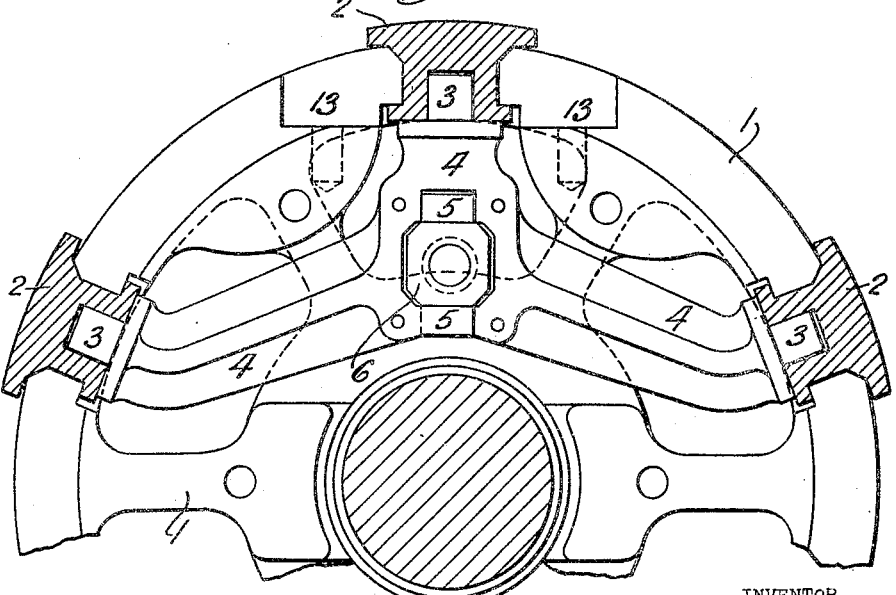

In the accompanying drawings which illustrate the invention Figure 1 is a half section, Figure 2 is an end view with parts removed, Figure 3 is a half section of a modification and Figure 4 is an end view thereof with parts removed.

1 is a type cylinder, 2 are clips so mounted on the cylinder 1 as to be capable of sliding in a direction parallel to the axis of the cylinder. The clips 2 are recessed to receive studs 3 on a spider 4. The spider 4 is recessed to receive trunnions 5 on a nut 6, the trunnions being held in position by plates 7 (see Figure 1) which are screwed to the spider. In Figure 2 the plates 7 have been omitted.

Screwing into the nut 6 is a threaded shaft 8 mounted at one end in a bearing formed in the cylinder 1 and at the other end in a bearing formed in a thrust plate 9 which is bolted to the end of the cylinder. Fast with the shaft 8 is a mitre wheel 10 gearing with a mitre wheel 11 rotatably mounted in a plate 12 secured in a recess 13 in the cylinder 1. Longitudinal movement of the mitre wheel 11 is prevented by a stud 14 which engages a groove 15 therein. The wheel 11 is also provided with a square recess 16 to receive an actuating key.

In operation when it is desired to secure a stereotype plate in position on the cylinder 1, the clips 2 are moved towards a fixed ring or back (not shown) on the cylinder 1 by turning the mitre wheel 11. If the edges of the stereotype plate are uneven the spider 4 can rock on the trunnions 5 so that an even pressure is exerted by the clips 2.

In the modification shown in Figures 3 and 4, similar parts have similar figures.

In this modification the threaded shaft 8 engages a ball nut 17 mounted in a recess in the spider 4 and held in position by plates 7, screwed to the spider 4. The ball nut 17 allows the spider 4 to rock in any direction.

What I claim is:—

1. In means for securing a stereotype plate to a form cylinder, the combination of a plurality of plate clamps, a member having projections integral therewith and directly engaging the clamps and so mounted as to be capable of rocking, and means for moving the member longitudinally of the cylinder to effect the locking-up or release of the clamps.

2. In means for securing a stereotype plate to a form cylinder, the combination of a plurality of clamps, a spider having studs integral therewith and directly engaging the clamps, a screw rod, a nut carried by the spider and so arranged that the rod can rock relatively to the spider, and means for rotating the rod.

3. In means for securing a stereotype plate to a form cylinder, the combination of a plurality of clamps, a spider having projections integral therewith and directly engaging the clamps, a screw rod, a spherical nut engaged thereby on which the spider is mounted, and means for rotating the rod.

4. In means for securing a stereotype plate to a form cylinder, the combination of a plurality of clamps, a spider having studs integral therewith and directly engaging the clamps, a rocking bearing on which the spider is mounted, a rod screwed through the bearing, and means for rotating the rod for moving the spider longitudinally of the cylinder to effect a lock-up or release of the clamps.

In testimony that I claim the foregoing as my invention I have signed my name this 23rd day of October 1923.

ROBERT WILLIAM HATTON.